(12) United States Patent
Rouge et al.

(10) Patent No.: US 7,875,355 B2
(45) Date of Patent: Jan. 25, 2011

(54) MULTI-LAYER COATING SYSTEM INCLUDING A HYDROXYL MODIFIED POLYURETHANE DISPERSION BINDER

(75) Inventors: John M. Rouge, North Royalton, OH (US); Joseph P. Grill, North Olmsted, OH (US); Sean X. Huang, Hudson, OH (US); Wayde A. Jenkins, Perry, OH (US); Kristopher M. Modrzynski, Reminderville, OH (US); Gerald L. Moore, Newbury, OH (US); William R. Papczun, Hudson, OH (US); Brian J. Pavia, Aurora, OH (US); Joseph C. Vendel, Ashtabula, OH (US)

(73) Assignee: The Sherwin-Williams Company, Cleveland, OH (US)

( * ) Notice: Subject to any disclaimer, the term of this patent is extended or adjusted under 35 U.S.C. 154(b) by 1157 days.

(21) Appl. No.: 11/427,979

(22) Filed: Jun. 30, 2006

(65) Prior Publication Data
US 2007/0010612 A1 Jan. 11, 2007

Related U.S. Application Data

(60) Provisional application No. 60/695,942, filed on Jul. 1, 2005, provisional application No. 60/697,097, filed on Jul. 7, 2005.

(51) Int. Cl.
*B32B 27/40* (2006.01)
(52) U.S. Cl. .................................... 428/423.1
(58) Field of Classification Search .............. 428/423.1; 528/33
See application file for complete search history.

(56) References Cited

U.S. PATENT DOCUMENTS

| | | | |
|---|---|---|---|
| 3,577,388 A | 5/1971 | Megna et al. | |
| 3,886,122 A | 5/1975 | Fabris et al. | |
| 3,891,527 A | 6/1975 | Sekmakas | |
| 4,310,565 A | 1/1982 | Lehner et al. | |
| 4,530,977 A | 7/1985 | Lewarchik et al. | |
| 4,742,100 A | 5/1988 | Kay et al. | |
| 4,780,512 A | 10/1988 | Gould et al. | |
| 4,791,168 A | 12/1988 | Salatin et al. | |
| 4,822,685 A * | 4/1989 | Perez et al. | 428/423.3 |
| 4,876,308 A | 10/1989 | Melby et al. | |
| 4,946,910 A | 8/1990 | Savino et al. | |
| 4,978,708 A | 12/1990 | Fowler et al. | |
| 5,006,413 A | 4/1991 | Den Hartog et al. | |
| 5,045,622 A | 9/1991 | Kohno et al. | |
| 5,051,464 A | 9/1991 | Johnson et al. | |
| 5,066,732 A | 11/1991 | Savino et al. | |
| 5,095,069 A | 3/1992 | Ambrose et al. | |
| 5,100,735 A | 3/1992 | Chang | |
| 5,157,069 A | 10/1992 | Campbell | |
| 5,169,719 A | 12/1992 | Balatan | |
| 5,204,401 A | 4/1993 | Anderson, Jr. et al. | |
| 5,219,663 A | 6/1993 | Kohno et al. | |
| 5,286,569 A | 2/1994 | Werner, Jr. et al. | |
| 5,314,945 A | 5/1994 | Nickle et al. | |
| 5,342,882 A | 8/1994 | Gobel et al. | |
| 6,001,424 A | 12/1999 | Lettmann et al. | |
| 6,057,400 A | 5/2000 | Kinney et al. | |
| 6,265,468 B1 | 7/2001 | Chambers et al. | |
| 6,384,131 B1 | 5/2002 | Kinney et al. | |
| 6,534,620 B1 | 3/2003 | Hovestadt et al. | |
| 6,559,265 B2 | 5/2003 | Lamers et al. | |
| 6,562,894 B1 | 5/2003 | Blum et al. | |
| 6,566,444 B1 | 5/2003 | Gobel et al. | |
| 6,620,511 B1 * | 9/2003 | Wigger et al. | 428/413 |
| 6,624,276 B2 | 9/2003 | Lamers et al. | |
| 6,815,494 B2 * | 11/2004 | Wigger et al. | 524/591 |
| 2002/0028875 A1 | 3/2002 | Anderle et al. | |

FOREIGN PATENT DOCUMENTS

| | | |
|---|---|---|
| DE | 19849207 | 4/2000 |
| EP | 0661317 | 11/1998 |
| EP | 0695791 | 10/1999 |
| EP | 1027382 | 11/2001 |
| EP | 1209180 A1 | 5/2002 |

(Continued)

OTHER PUBLICATIONS

International Searching Authority, International Search Report and Written Opinion of the International Searching Authority, mailed Sep. 3, 2007.

(Continued)

*Primary Examiner*—Thao T. Trran
(74) *Attorney, Agent, or Firm*—Eryn Ace Fuhrer; Robert E. McDonald; Arthi K. Tirey

(57) ABSTRACT

A multi-layer coating system comprising a hydroxyl-functional polyurethane dispersion is provided. The hydroxyl-functional polyurethane comprises the reaction product of a pre-polymer intermediate formed from the reaction of an isocyanate with an active hydrogen containing compound, such as a polyester polyol, with a compound having at least two amine groups and one hydroxyl group, such as a diamino alcohol. In addition, a waterborne basecoat composition is provided having improved rheology and pattern control. Such a waterborne basecoat composition comprises a hydroxyl-functional polyurethane dispersion an acrylic emulsion resin, a water-reducible polyester resin, and a cellulose ester.

26 Claims, No Drawings

FOREIGN PATENT DOCUMENTS

| | | |
|---|---|---|
| EP | 1285936 A2 | 2/2003 |
| EP | 1149635 | 3/2006 |
| JP | 7331118 | 12/1995 |
| JP | 8283612 | 10/1996 |
| JP | 2000144058 | 5/2000 |
| JP | 2001064546 | 3/2001 |
| WO | WO 0071343 | 11/2000 |
| WO | WO 2004061021 | 7/2004 |

OTHER PUBLICATIONS

Eastman Chemical, CMCAB Cellulose Ester Introduction, available at least as early as Jun. 22, 2005.

Akzo Nobel, Resins for Vehicle Refinishes, Mar. 2003.

* cited by examiner

MULTI-LAYER COATING SYSTEM INCLUDING A HYDROXYL MODIFIED POLYURETHANE DISPERSION BINDER

This application claims priority from U.S. Provisional Application No. 60/695,942 filed Jul. 1, 2005 and U.S. Provisional Application No. 60/697,097 filed Jul. 7, 2005, which are both incorporated herein by reference in their entireties.

The present invention relates to multi-layer coatings systems such as vehicle basecoat/clearcoat systems for use in either original equipment manufacturer (OEM) production or in automotive vehicle refinish (VR) applications. The coating system may include a primer, basecoat, and clearcoat combination. It may also include 3-stage topcoat systems, where the topcoat is comprised of clearcoat, midcoat, and groundcoat, on top of any undercoats. In one embodiment, the present invention includes a novel low volatile organic content (VOC) basecoat composition. In another embodiment, the invention comprises a novel binder composition for use in coatings.

Multi-layer coatings for use over the surface of automobiles, trucks, machinery and the like have been in use for years. Originally, such coating systems used organic solvents. As environmental concerns and regulations became more stringent? the need to reduce the amounts of organic solvents in the coating systems became more important. In recent years, the development of waterborne systems has increased. In particular, the development of waterborne systems as part of VOC compliant basecoat/clearcoat systems has increased. The present invention relates to low VOC basecoat and/or clearcoat compositions useful in multi-layer coatings systems for both OEM and VR applications. The basecoat comprises a novel binder system, is low in VOC, has desirable application properties, and can be pigmented with a broad range of pigments readily available and used in the automotive industry, including non-metallic pigments, metallic pigments and other opalescent pigments.

Waterborne toner compositions are usually formed by mixing two main components (a) one or more pigment dispersions (pigment grind pastes) and (b) a letdown clear. Many basecoat colors are the result of a combination of two or more pigmented toners, resulting in end-use compositions which may be weighted averages of toner compositions disclosed herein, and may be different from the individual toner examples presented herein. Toners comprise various pigments including, but not limited to, chromatic pigments such as titanium dioxide, carbon black, red oxide and the like, opalescent pigments such as micas, and metallic pigments such as aluminums. Generally, such pigments are available in the form of dry powder that needs to be properly dispersed before incorporation into a paint system, the art of which is described herein; however, dispersed pigments are also commercially available and potentially useful for low VOC waterborne coating technology as described below. The combination of one or more toners as described above provides an OEM painter or a VR refinisher with a desired basecoat color.

In one embodiment of the present invention, a toner is formulated by mixing one or more pigmented dispersions and one or more letdown clear components prior to application to a substrate, for example, before packaging. A letdown clear composition in accordance with such an embodiment of the present invention comprises a hydroxyl-functional polyurethane dispersion (PUD) as a binder. The letdown clear may also comprise water, organic solvents, filler pigments, other resins, and one or more other additives in varying amounts and combinations as needed to achieve desired properties as described herein. Other resins that may be used in the present invention include, but are not limited to, aqueous emulsion polymers produced by a free-radical addition polymerization reaction, water reducible resins, and cellulose esters.

Aqueous basecoat coating compositions in accordance with the present invention comprise one or more toner compositions and optionally (i) one or more reducers. (ii) a mixing clear; and (iii) crosslinking agents mixed with the toner prior to application, such as by an applicator shortly or immediately before applying the basecoat composition.

It should be understood that this invention is not limited to specific synthetic methods or to particular formulations, unless otherwise indicated, and, as such, may vary from the disclosure. It should also be understood that terminology used is for the purpose of describing a particular embodiment only, and is not intended to limit the scope of the invention.

Unless otherwise indicated, all numbers expressing quantities of ingredients, properties such as molecular weight, reaction conditions and so forth used in the specification and claims are to be understood as being modified in all instances by the term "about." Accordingly, unless indicated to the contrary, the numerical parameters as set forth in the following specification and attached claims are approximations that may vary depending on the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

As used herein the term "isocyanate" shall mean any compound that contains one or more isocyanate or thioisocyanate groups or a combination thereof. As used herein the term "polyisocyanate" shall mean a compound that has a plurality (more than one) of isocyanate groups or thioisocyanate groups or compounds and adducts containing one or more each of isocyanate groups and thioisocyanate groups.

One embodiment of the present invention comprises a basecoat coating composition, which includes a binder composition comprising a hydroxyl-functional polyurethane dispersion. A water-based hydroxyl-functional PUD in accordance with the present invention comprises the reaction product of (A) an isocyanate pre-polymer intermediate and (B) a chain extenders. The isocyanate pre-polymer may be comprised of the reaction product of (i) an isocyanate compound and (ii) an active hydrogen-containing compound. An active hydrogen reacts with an isocyanate group to form a urethane group. In one embodiment, a molar excess of the isocyanate may be used to result in a pre-polymer having free isocyanate groups. Component (B), the chain extenders, may be comprised of compounds having at least two active hydrogens and at least one hydroxyl group. In use, the hydroxyl-functional PUD's of the present invention may be cured by evaporation of water and the coalescence of the individual polymer particles.

Isocyanate pre-polymers useful in the present invention may comprise the reaction product of an isocyanate compound and an active-hydrogen containing compound. Isocyanates useful herein may be aliphatic cycloaliphatic, or aromatic isocyanates or mixtures thereof. The isocyanate nay comprise, for example, monoisocyantes, diisocyanates or higher polyisocyanates. In addition, the isocyanates may be selected from saturated or unsaturated oligomeric isocyanates, for example those formed by the reaction of compounds such as maelic anhydride/neopentyl glycol oligomer which is reacted with an isocyanate compound. Further, substituted organic isocyanates including substituents where the substituents are, for instance, nitro, chloro, alkoxy and other groups which are not reactive with hydroxyl groups or active hydrogens, provided the substituents are not positioned to render the isocyanate group or groups unreactive. Examples of suitable isocyanates include, but are not limited to ethylene diisocyanate, cyclohexyl isocyanate, phenyl isocyanate, toluene isocyanate, 1,2,4-benzene triisocyanate, pure or polymeric diphenylmethane diisocyanates such as 4,4'-diphenylmethane diisocyanate, 1,3-phenylene diisocyanate, 1,4-phenylene diisocyanate, tolylene diisocyanate, 1,4-tetramethylene diisocyanate, 1,6 hexamethylene diisocyanate, 2,4,4-trimethyl 1,6-hexamethylene diisocyanate, 1,4-cyclohexyl diisocyanate, isophorone diisocyanate (IPDI), 4,4'-methylene-bis(cyclohexylisocyanate), 1,12-dodecane diisocyanate, cyclobutane-1,3-diisocyanate, cyclohexane-1,3- and/or 1,4-diisocyanate, 1-isocyanto-2-isocyantomethyl cyclopentane, 2,4- and/or 2,6-hexahydrotoluylene diisocyanate, 2,4- and/or 4,4'-dicyclohexylmethane diisocyanate, α,α,α',α-tetramethyl-1,3- and/or -1,4-xylylene diisocyanate, 1-isocyanto-1-methyl-4(3)-isocyantomethyl-cyclohexane, 1/3- and 1,4-phenylene diisocyanate, naphthalene-1, 5-diisocyanate, triphenyl methane-4,4',4"-triisocyanate, polyphenyl polymethylene polyisocyanates, as well as other similar isocyanates known or discovered to be capable for use in coatings applications, and mixtures of the foregoing.

The isocyanate is reacted with a compound having reactive components that can react/crosslink with isocyanate groups to form a pre-polymer. Such reactive components may comprise active hydrogen atoms. To form a pre-polymer having free isocyanate groups, the number of isocyanate groups supplied by the isocyanate should exceed the number of active hydrogen atoms. Examples of active-hydrogen containing compounds include polymeric polyhydroxyl compounds such as polyhydroxylated polyethers, polyesters, polyesteramids, polycarbonates, hydroxyl-functional acrylics, hydrocarbons, hydroxyl functional polybutadienes and hydroxyl functional hydrogenated polybutadienes. In one useful embodiment, a polyester polyol may be used to form the pre-polymer. In another embodiment, a polyether polyol may be used. Other polyhydroxyl compounds such as ethylene glycol, propylene glycol, diethylene glycol, glycerol, sorbitol, pentaerythritol, dipropylene glycol and the like may also be used, alone or in combination with the polymeric polyhydroxyl compounds.

Polyester polyols are formed through condensation of one or more polyhydric alcohols with one or more polycarboxylic acids. Suitable polyhydric alcohols include, but are not limited to, glycerol, pentaerythritol, trimethylolpropane, 1,4,6-octanetriol, butandiol, pentanediol, hexanediol, dodecanediol, octanediol, chloropentanediol, glycerol monoalkyl ether, glycerol monoethyl ether, diethylene glycol, 2-ethyl-hexanediol-1,4, cyclohexanediol-1,4, 1,2,6-hexanetriol, 1,3, 5-hexanetriol, 1,3-bis-(2-hydroxyethoxy)propane, neopentyl glycol, 2-methyl propanediol, trimethylol propane monoallylether, 2,2,4-trimethyl-1,3-pentanediol, 1,4-butanediol, cyclohexanedimethanol, 2,2-dimethyl-3-hydroxypropyl-2, 2-dimethyl-3-hydroxypropionate, and the like. Examples of polycarboxylic acids include, but are not limited to phthalic acid, isophthalic acid, terephthalic acid, tetrachlorophthalic acid, maelic acid, dodecylmaleic acid, octadecenylmaleic acid, fumaric acid, aconitic acid, trimellitic acid, tricarballylic acid, 3,3'-thiodipropionic acid, succinic acid, adipic acid, cyclohexane-1,2-dicarboxylic acid, 1,4-cyclohexadiene-1,2-dicarboxylic acid and the corresponding acid anhydrides, acid chlorides and acid esters. In one useful embodiment, the polycarboxylic acids are aliphatic and cycloaliphatic dicarboxylic acids containing no more than fourteen carbon atoms and the aromatic dicarboxylic acids containing no more than fourteen carbon atoms with the proviso that any polyhydric alcohol having more than 2 hydroxyl groups or any polycarboxylic acid having more than 2 carboxylic groups should be used in very minor amounts to prevent crosslinking and gelling.

A variety of polyether polyols may also be used. Polyether polyols are generally made by polymerization of an alkylene oxide such as ethylene oxide and propylene oxide under strong base catalysts, such as potassium hydroxide, usually in the presence of water, glycols and the like. Polyethers having highly branched chains are readily prepared from alkylene oxides and initiators having active hydrogen functionality greater than two. The higher functional initiators that are useful with the alkylene oxides described above include polyols, polyamines, and amino alcohol having a total of three or more reactive hydrogen atoms on hydroxyl and primary or secondary amino groups.

Examples of polyols include, but are not limited to, triols, such as glycerol trimethylpropane, butanetriols, hexanetriols, trialkanolamines, various diethylenetriamine, such as erythritol and pentaerythritol, pentols, hexols, such as dipentaaerythritol and sorbitol, as well as alkyl glycosides, carbohydrates, polyhydroxy fatty acid esters such as caster oil, and polyoxy alkylated derivatives or polyfunctional compounds having three or more reactive hydrogen atoms, such as for example, the reaction product of trimethylolpropane, glycerol and other polyols with ethylene oxide, propylene oxide or other epoxides or copolymers thereof, e.g., copolymers ethylene and propylene oxides, and ethylene oxide being used in a molar amount of not over 20 mol % as compared to other alkylene oxides like propylene oxide. Higher functional amino alcohols and polyamines include, for example, ethanolamine, diethanolamine, triethanolamine, isopropanolamine, diisopropanolamine, triisopropanolamine, 2-(2-amino-ethylamino)ethanol, 2-amino-2-(hydroxymethyl)-1, 3-propanediol, ethylenediamine, diethylenetriamine, triethylenetriamine, and urea as well as various aryl polyamines, such as 4,4',4"-methylidynertrianiline.

Polycarbonate polyols such as the reaction product of 1,3-propanediol, 1,4-butanediol, 1,6-hexanediol, diethylene glycol, or tetraethylene glycol with diaryl carbonates such as diphenyl carbonate or phosgene may also be used.

Other compounds such as castor oil, lesqurella oil, cellulose derivatives and other natural hydroxyl compounds are also widely used to synthesize isocyanate pre-polymers.

Techniques known in the art may be used for preparing the pre-polymer. For example, one or more isocyanates may be charged to a suitable reaction vessel followed by addition of one or more active-hydrogen containing compounds. The mixture may be heated if necessary until the isocyanate has reacted with substantially all of the active hydrogen atoms. The reaction of the active hydrogen atoms is usually considered to be complete when the equivalent weight of the isocyanate groups reaches a constant level.

A catalyst may be employed to accelerate the reaction to form the pre-polymer. Examples of suitable catalysts include dibutyltin dilaurate, stannous octoate and the like. The reaction may occur in minutes or may take several hours to days to complete depending on the reactivity of the reactants, temperature, mixing, presence of the catalyst, as well as other factors.

A solvent may also be employed for the pre-polymer formation reaction. In the alternative, a solvent may be added after the pre-polymer is formed. In one embodiment, a solvent that does not contain active hydrogen atoms may be added to the isocyanate pre-polymer intertmediate. In another embodiment, suitable solvents include but are not limited to ketones, tertiary alcohols, ethers, esters, hydrocarbons, and chlorocarbons. More specific examples of solvents include acetone, N-methyl pyrrolidone, and acetonitrile. Solvents may dissolve the pre-polymer and assist with controlling the viscosity of the pre-polymer. The viscosity of the pre-polymer may affect the stability of the final dispersion. The viscosity of the pre-polymer can be reduced in several ways, for instance by heating the neat pre-polymer melt, by dissolving the pre-polymer in a suitable solvent, or by conducting the isocyanate reaction in a suitable solvent in one embodiment, the solvent may be present in an amount sufficient to reduce the viscosity of the pre-polymer to a desired level. In some embodiments, it may be desirable to remove the solvent after the polymer is dispersed in a liquid carrier medium, such as water. In such cases, it may be desirable to use solvents with relatively high vapor pressures to facilitate solvent removal. In some embodiments, the solvent may be used in an amount up to about 60%. for example about 3% to about 40% by weight, based on the total weight of the solvent and isocyanate-containing pre-polymer.

The amount of isocyanate and active-hydrogen containing compound should be such that the resultant pre-polymer has free isocyanate groups. The equivalent ratio of isocyanate to active-hydrogen containing compound may be at least about 1.2:1. In one embodiment, the molar ratio of isocyanate to active-hydrogen may be in the range of about 7 to 1.2:1; in another embodiment about 6 to about 1.2:1; in still another embodiment about 3 to 1.2:1 in a further embodiment, about 1.5 to 1.9:1, such as about 1.7:1.0.

Once prepared, the isocyanate pre-polymer may be dispersed in an aqueous medium. A salt forming agent may be added to the aqueous medium or to the pre-polymer. The salt forming agent may be added to the pre-polymer solution, be contained in the aqueous medium prior to addition of the pre-polymer or may be added after the pre-polymer is introduced to the aqueous medium. In addition, the salt forming agent may also be added after the addition of a crosslinker/ chain extenders as described herein. The salt forming agent may be selected to interact with ionizable groups of the pre-polymer. For example, when such ionizable groups comprise an acid, such as carboxylic acid, suitable salt forming agents include bases. When the ionizable group comprises a base, acidic salt forming groups may be utilized. Examples of suitable inorganic and organic bases include monofunctional primary, secondary, and tertiary amines, e.g. methylamine, diethylamine, triethylamine, trimethylamine, dimethylamine, ethylamine, tributylamine, pyridine, aniline, and toluidine; hydroxylated amines L ethanolamine, diethanolamine, triethanolamine, nethyldiethanolamine and oleyldiethanolamine; polyfunctional polyamines in which the individual amino groups may or may not possess different basicities, e.g. polyamines obtained by hydrogenation of adducts of acrylonitrile with primary or secondary amines, completely or partially alkylated polyamines, e.g. N,N'-dimethylethylenediamine, and compounds such as $\alpha$-aminopyridine and N,N-dimethylhydrazine. Inorganic compounds such as ammonia, and monovalent metal hydroxides, carbonates and oxides e.g. sodium hydroxide, potassium hydroxide, sodium carbonate, potassium carbonate and sodium bicarbonate, and the like may also be useful. Further, inorganic and organic acids and compounds containing reactive halogen atoms may also be useful. Such acids and compounds include, but are not limited to hydrochloric acid, nitric acid, amidosulfonic acid, formic acid, acetic acid, glycolic acid, and butyl bromide.

The aqueous medium may also include other ingredients such as defoamers or surfactants. Various known and commercially available defoamers and surfactants may be used in connection with an aqueous medium for the hydroxyl-functional PUD of the present invention.

Usually, the pre-polymer is dispersed in an aqueous medium prior to the addition of the chain extender/ crosslinker. In one embodiment, to for a finely dispersed stable polyurethane composition, the isocyanate functional pre-polymer may have a viscosity at the dispersion temperature in the range of about 10 to about 20,000 cP, for example about 100 to 5,000 cP, as measured by a Brookfield viscometer. The viscosity of the pre-polymer solution may be decreased by adding additional solvent, e.g. acetone, and/or by using higher temperatures during dispersion, or the viscosity may be increased by using less solvent, e.g. acetone, and/or by using lower temperatures during dispersion.

The amount of the aqueous medium should be sufficient to form a dispersion that has the desired physical properties. The aqueous medium may comprise for example, about 15% to about 80% by weight, or further for example, about 50% to about 80% by weight of the total dispersion. Water may be present in an amount of at least about 30% by weight or further for example, at least about 45% by weight with a co-solvent comprising the remainder of the aqueous medium. A variety of co-solvents known to those of ordinary skill in the art may be employed at this stage. Examples of useful co-solvents include, but are not limited to ketones, tertiary alechols, ethers, esters, hydrocarbons- and chlorocarbons.

The pre-polymer ma, be added to the aqueous medium or the aqueous medium may be added to the pre-polymer to form the dispersions of the present invention. The pre-polymer may be dispersed in the aqueous medium by various forms of mixing and/or agitation. In one useful embodiment of the present invention, high shear mixing is used to aid in dispersing the pre-polymer in the aqueous medium.

A chain extender reacts with the pre-polymer formed as described above to form the polyurethane polymer of the present inventon. In one embodiment of the present invention, it is desired that the polyurethane polymer have hydroxyl functionality. In one such embodiment, the reaction of the pre-polymer intermediate with the chain extender results in a polyurethane composition having pendant hydroxyl groups positioned along the polymer backbone, rather than terminal positions. In one embodiment, the polyurethane is substantially free of terminal hydroxyl groups. In another useful embodiment, the polyurethane comprises at least 2 pendant hydroxyl groups, but is substantially free of terminal hydroxyl groups. It has been found that to obtain polyurethane polymer having such pendant hydroxyl groups, that chain extenders comprising diamino alcohols may be used. In one useful embodiment, diamino alcohols employed in connection with the present invention may contain any combination of primary or secondary amine and hydroxyl groups, for example, a diamino alcohol having 2 primary amine groups and one secondary alcohol group may be useful in the present invention. In one embodiment, one or more diamino alcohols may be selected from those wherein the reactivity of the two amine groups with an isocyanate of the pre-polymer is greater than the reactivity of the hydroxyl group with an isocyanate of the pre-polymer. Examples of suitable diamino alcohols include, but are not limited to 1,3-diamino-2-propanol and aminoethylethanolamine.

In one embodiment, the chain extender compound is included at a level of about 0.1% to about 10% by weight of the total polyurethane dispersion, for example, about 2.5% to about 10.0%, and further for example, about 2.5%. The amount of chain extender may also be calculated based upon the desired hydroxyl value of the hydroxyl-functional polyurethane polymer. Hydroxyl-functional polyurethane polymers of the present invention may have hydroxyl values such as about 0.62 to about 62.3. Further, for example, the hydroxyl-functional polyurethane polymers may have a hydroxyl value of about 5 to about 40, for example about 10 to about 3. As a further example, a hydroxyl-functional polyurethane polymer in accordance with the present invention may have a hydroxyl value of about 15.

In one embodiment of the present invention, the hydroxyl-functional polyurethane polymers have a molecular weight that is at least about 5,000 and further that is at least about 10,000. In one useful embodiment, the polyurethane polymer may have an Mn of about 20,000 as measured at room temperature by gel permeation chromatography based on a polystyrene standard.

In one useful embodiment, the resulting chain-extended, hydroxyl-functional polyurethane polymer has a high molecular weight and is in the form of a stable, water-based composition. As used herein, "high molecular weight" means a molecular weight of at least 5000. Also, as used herein, the term "stable" may be considered to mean that the polyurethane polymer of the invention remains un-gelled at a temperature of about 120° F. for a period of several weeks. Stability may also be indicated when there is no visible settling of solids from the dispersion and a minimal pH shift of the dispersion over a period of several weeks at 50° C. In one embodiment, the water-based composition comprising the hydroxyl-functional polyurethane polymer is in a stable dispersion wherein the polymer is a dispersed phase and an aqueous medium is in a continuous phase. In one embodiment, the hydroxyl-functional polyurethane polymer is non-sedimenting. In another useful embodiment, when any hydroxyl-functional polyurethane polymer does sediment, it can be re-dispersed by mixing or agitation.

In one useful embodiment of the present invention, a hydroxyl-functional PUD of the present invention has a solids content of about 33-35%. In another useful embodiment, the dispersion has a maximum viscosity of about 500 cP, measured by a Brookfield viscometer.

When the hydroxyl-functional PUD of the present invention is included in a coating formulation, it will cure without the addition of external crosslinkers. However, additional crosslinking or curing agents may be employed in combination with the polyurethane dispersion of the present invention and may provide enhanced performance of the coating. Any additional crosslinking or curing agent compounds that are reactive with hydroxyl functionality may be combined with the hydroxyl-functional PUD of the present invention shortly before application or during application, such as by a 2-component sprayer. Such crosslinking or curing agents include, but are not limited to, isocyanates or melamines.

In one embodiment of the present invention, a hydroxyl-functional PUD as described above may be incorporated into a vehicle basecoat formulation. For instance, a hydroxyl-functional PUD may be included in the letdown clear component of a toner composition or it may be included in a mill base used in a coating composition. In one embodiment, the hydroxyl-functional PUD may comprise about 10% to about 85% of a letdown clear composition. In other embodiments, the amount of hydroxyl-functional PUD may be calculated based on the final toner composition. In general, the hydroxyl-functional PUD may comprise about 7% to about 60% of a toner composition. In one such embodiment of the invention, toner compositions may comprise about 7% to about 10% by weight of the hydroxyl-functional PUD. In an alternative embodiment, the toner compositions comprise 7% to 10% by weight of the hydroxyl-functional PUD described herein and a combination of acrylic emulsion polymers, water-reducible polyester resins, and cellulose esters make up the remainder of the resin matrix. In another exemplary embodiment, a toner composition may comprise about 15% to about 40% by weight of the hydroxvl-functional PUD described herein. In still another exemplary embodiment, a toner composition comprises about 30% to about 60% by weight of the hydroxyl-functional PUD. Various other additives as described herein may be included with the hydroxyl-functional polyurethane dispersion to form the letdown clear of the present invention. As described in more detail below, the amount of hydroxyl-functional PUD in the toner compositions usually depends on the specific colorant with which it is used.

In describing the toner and basecoat formulation in accordance with the present invention, two general categories of pigments (and therefore toners and basecoats) will be mentioned: (1) chromatic and (2) effect. Chromatic pigments comprise various organic and inorganic pigments including but not limited to titanium dioxide; carbon black; graphite black; transparent and opaque iron oxide reds and yellows, nickel titanate yellows; bismuth vanadate yellows; quinacridone reds, magentas and purples; phthalocyanine copper blues and greens; naphthlenolato copper yellow; isoindolinone yellow; benzimidazolone yellows and oranges; diketo pyrrolo pyrolle oranges and reds; anthraquinone red; oxazine violet; and indanthrone blue. The general formulation of basecoats incorporating chromatic pigments is basically the same. Effect pigments include metallic pigments, such as aluminum pigments, including coated aluminum pigments such as iron oxide coated aluminum, and opalescent pigments, such as micas and aluminum oxide platelets coated with various metal oxides. Metallic pigments also include but are not limited to fine and coarse aluminums, cornflake to pancake aluminums, and colored aluminums. The formulation of effect basecoats in general may differ somewhat from the formulation of chromatic basecoats to achieve the desired coating properties. In addition, the formulation of mica basecoats may differ somewhat from metallic basecoats to achieve the desired coating properties.

Toner compositions of the present invention comprise a hydroxyl-functional PUD as described above and optionally comprise one or more other resins or other additives. Other resins that may be included in the letdown clears in addition to the hydroxyl-functional PUD include for example, aqueous emulsion polymers, cellulose esters, and water reducible resins. Aqueous emulsion polymers, include but are not limited to acrylic latexes. Cellulose esters or modified cellulose esters may include carboxymethylcellulose acetate butyrate (CMCAB) and the like. Various CMCAB cellulose esters are commercially available. Other water-reducible resins may also be included, such as water-reducible polyesters. Various combinations of the above polymers/polymer dispersions may also be utilized in a letdown clear or pigment dispersion component in accordance with the present invention. Such polymers as described above may be added to improve the properties of the basecoat. For instance, such polymers may act as rheology modifiers, may improve the dry time of the basecoat, may improve the pigment wetting, and also may improve pattern control of the waterborne basecoat.

In addition to the hydroxyl-functional PUD, a toner composition in accordance with the present invention may also include other additives, including but not limited to defoamers, dispersants, rheology modifiers, passivating agents, biocides, surfactants, neutralizing agents, solvents, flattening agents, solvents, and UV stabilizers as are known in the art. Defoamers may be used to control foam to achieve fewer defects in the paint film. Examples of defoamers include waterborne emulsions of organo-modified siloxanes, e.g. polyether siloxane copolymers or polyether polymethyl siloxane copolymers. Other defoamers selected from non-oil or non-silicone defoamer compositions may also be used. Dispersants may be used to entropically stabilize pigment dispersions. Examples of dispersants include amine-functional branched high molecular weight copolymers (often of ethylenically unsaturated monomer and/or macromer), and homopolymer ethylene and its functional derivatives, e.g., dispersions of ethoxylated primary alcohols. Rheology modifiers may include, but are not limited to silica, clay, associative thickeners, alkali-swellable thickeners, aqueous dispersions of high-functional polyurethane and/or enzymatically-modified starch, and/or organically-modified hectorite clay. In addition, other resins such as polyesters and cellulose esters may act as rheology modifiers as well. Passivating agents may neutralize and inhibit oxidation of aluminum surfaces, which may enhance stability and reduce gas formation. Examples of passivating agents include, but are not limited to phosphoric acid esters, e.g. phosphoric monoesters. Biocides may be used to prevent deterioration and spoilage during manufacture and storage as well as during service by inhibiting growth of organic material. Examples of biocides include 5-hydroxymethyl-1-aza-3,7-dioxabicyclo(3-3-0)octane and its alkoxy derivatives. Surfactants are known in the art to enhance coatings performance by reduction of the surface tension of waterborne coatings. Improved performance characteristics may include improved wetting, foam reduction, and film appearance. Examples of suitable surfactants include acetylenic glycol-based and acetylenic diol-based surfactants e.g. tetramethyl dodecyn diol. Neutralization agents can be used to adjust the pH of the resins, intermediates and finished products. Examples of neutralization agents include dimethyl ethanol amine ("DMEA"), triethyl amine, ammonia and diethyl amine; other commercially available neutralizers are known and may also be used. Solvents may be used to reduce viscosity and may also affect properties such as film forming/coalescing and metal control. Suitable solvents, include, but are not limited to N-methyl-2-pyrrolidone, hydrocarbon solvents, and glycol ethers, e.g. propylene glycol N-propyl ether, diethylene glycol methyl ether, propylene glycol methyl ether, ethylene glycol butyl ether, ethylene glycol propyl ether, diethylene glycol ethyl ether, diethylene glycol propyl ether, and diethylene glycol butyl ether. Silica may also be added. The additives listed above as well as other known additives may be added to either the letdown clear or the pigmented dispersion or to a mixture comprising a letdown clear and pigmented dispersion.

In general, letdown clear components of the present invention may comprise about 10% to about 85% by weight of the hydroxyl-functional PUD described herein. The letdown clear may also comprise water, organic solvents, gloss reducing agents, rheology modifiers, defoamers, surfactants, pH neutralizing agents, biocides, or other resins in varying amounts. If included, water may comprise up to about 50% by weight of the letdown clear. Also, if included, organic solvents may comprise up to about 15% by weight of the letdown clear. In addition, ingredients such as amorphous silica and organoclay may be included to enhance various properties of the coating composition. If included, amorphous silica may comprise up to about 2% by weight of the letdown clear. If included in the letdown clear, organoclay may comprise up to about 1% of the total weight. Other commercially available additives may be included in trace amounts or in amounts sufficient to achieve desired properties or in accordance with the manufacturer's instructions. In addition, other resins as described above may be incorporated into a letdown clear as described herein below.

In general, pigment dispersions in accordance with the present invention comprise one or more resins, solvents (e.g. water or organic solvents), pigments and other additives usually selected from those described above. The pigment dispersions may comprise up to about 80% by weight pigment.

In one useful embodiment, a pigment dispersion in accordance with the present invention comprises pigment, a co-grind resin, water, and optionally, pH neutralization agent, dispersing aid(s), and defoamer(s). A co-grind resin useful in connection with pigment dispersions of the present invention is described in U.S. Pat. No. 6,057,400, which is assigned to the assignee of the present application, at Col. 7, 11.28-54, the cited portion of which is hereby incorporated by reference. In one embodiment, a hydroxyl-functional resin useful as a co-grind resin may be prepared by free-radical addition polymerization in 2-butoxy ethanol using t-butyl peroctoate as initiator between about 5% to about 15% methyl methacrylate, about 5% to about 15% styrene, about 10% to about 20% butyl acrylate, about 35% to about 45% butyl methacrvlate, about 10% to about 20% hydroxy ethyl methacrylate and about 5% to about 10% acrylic acid, all monomer percentages by weight of total monomer added. Cogrind resins formulated as above may be slightly acidic, therefore, the resin may be neutralized in water to form a solution before adding any other components. A pH neutralization agent, such as an amine, may be included in the pigment grind composition to provide about 100% to about 130% neutralization of the co-grind resin. Such levels of neutralization mav make the dispersed co-grind resin slightly basic.

Pigment dispersions comprising the co-grind resin described above are generally stable alone without being mixed with a letdown clear as described herein. Therefore, such pigmi-ent dispersions as described herein may be packaged, stored, and shipped and the letdown clear added prior to sale or application of the basecoat. In one embodiment, a pigment dispersion as described above is added to the letdown clear, althouglh it is possible for the letdown clear to be added to a vessel containing the pigment dispersion as well.

In another embodiment of the present invention, a pigment dispersion may comprise one or more resins, one or more solvents, pigment, one or more passivating agents, one or more dispersing aids, and one or more pH neutralizing agents. In one useful embodiment, a pigment may comprise about 10% to about 50%, e.g. about 20% to about 40%, by weight of the pigment dispersion. Also, the one or more resins may be selected from a co-grind resin, a water-reducible resin, an aqueous emulsion polymer, and a cellulose acetate butyrate ("CAB") type resin, or combinations thereof. As a further example, the resin may comprise a water-reducible polyester resin.

In one embodiment of the invention, a toner composition comprises (a) a pigment dispersion, (b) a letdown clear, optionally (c) water, and optionally (d) rheology modifier. For example, a pigment dispersion may comprise about 6% to about 70% of the total toner weight while the letdown clear may comprise about 30% to about 94% of the total toner weight. The ratio of the pigment dispersion to the letdown clear may depend on the type of pigment. In general, the pigment dispersion to letdown clear ratio is highest for toners with inorganic yellow and white pigments which have a greater density and have relatively poor coverage properties. The ratio lessens for toners that contain transparent blue, green and red organic pigments. Additional water and rheology modifiers depend on the desired characteristics of the toner and basecoat.

It has been observed that at least some toners formulated in accordance with the present invention contain higher levels of pigments than other commercially available toners. As examples a toner composition may comprise: about 35% to about 36% $TiO_2$, about 1% to about 3.5% carbon black, about 15% organic orange pigments, about 7% to about 9% phthalocyanine green pigments, about 5% to about 7% phthalocyanine blue pigments, about 6% to about 7% transparent oxide pigments, about 8% to about 15% opaque oxide pigments, about 5% to about 12% organic red pigments, about 34% to about 35.5% inorganic yellow pigments, about 3% to about 6% aluminum pigments, and about 22% to about 26% mica pigments (all % are by weight of the wet toner composition).

In another embodiment of the invention, the toner formulation does not follow the general procedure of mixing a pigment dispersion with a letdown clear. For some pigments, a pigment dispersion or a pigment and other additives as described herein may be added to a letdown clear containing the hydroxyl-functional PUD and mixed until a desired viscosity is achieved to form a toner. Such a toner may then be mixed with a mixing clear composition prior to application. The mixing clear may comprise a hydroxyl-functional PUD, co-grind resin, and one or more other resins such as aqueous eiulsion polytmers, water-reducible resins, and cellulose esters (e.g. CMCAB) as described herein. The mnixing clear may also comprise water, defoamers, pH neutralizing agents, biocides, solvents, and surfactants.

By way of example, a pigment dispersion may be prepared by mixing about 21.4% to about 76.6% water, 0.3% to about 1.7% pH neutralizing agent, about 3.3% to about 18.8% acrylic resin (e.g. co-grind resin described above), about 0.1% to about 0.3% defoamer(s), about 0.3% to about 23% dispersant(s), and about 10.4% to about 73.2% chromatic pigment (all % by weight of the pigment dispersion). The pigment dispersion may be prepared by mixing the above ingredients in a high-speed disperser (HSD) and/or a media mill until the grind is fine enough to achieve a 7 or 8 reading on a Hegman grind gauge. The pigment dispersion may then be added to a letdown clear composition. The mixing vessel may be rinsed with water and such rinse water added with the pigment dispersion to the letdown clear. A letdown clear in accordance with this example may comprise about 1.1% to about 1.3% silica, about 0.5% to about 4.% rheology modifier, about 61.5% to about 84.1% hydroxyl-functional polyurethane dispersion, about 0.4% to about 1.4% defoamer(s), about 2.1% to about 12.8% solvent(s), about 2% to about 6.6% surfactant(s), about 0.2% to about 0.4% biocide, and about 0.2% to about 1.6% associative thickener (all % by weight of the letdown clear.) If included, water may be included at up to about 19.6% by weight and a pH neutralizing agent (e.g. DMEA.) may be included at up to about 0.1% bv weight in the letdown clear. To form a toner, about 11.4% to about 70.2% of the pigment dispersion described above is added to about 78.5% to about 88.5% of the letdown clear described above (all % by weight of the toner). About 2% to about 33.1% by weight water may also be added to the toner. Also, up to about 2.4% of the toner may be an associative thickener added after the pigment dispersion, letdown clear and water have been mixed.

As another example, a toner may be made by combining an aluminum pigment dispersion and a letdown clear. The toner may comprise about 2.5% to about 24.5% by weight aluminum pigment dispersion, about 61.5% to about 86.5% by weight letdown clear, about 5% to about 25% water, and about 0.5% to about 3% by weight rheology modifier (all % by weight of the total toner composition). For purposes of this example, the pigment dispersion may comprise about 32.3% to about 38.2% aluminum pigment, about 3.9% to about 4.4% dispersing aid, about 1.1% to about 1.6% pH neutralizing agent, about 1.3% to about 1.8% passivating agent, about 97.1% to about 30.7% water reducible polyester, and about 23.3% to about 34.3% organic solvent(s) (all % by weight of the pigiment dispersion). The slurry made as described above is added to a letdown clear comprising about 20% to about 50% acrylic latex, about 5% to about 15% cellulose ester (e.g. CMCAB), about 0.15% to about 0.16% defoamner(s), about 30% to about 50% water, about 0.26% to about 0.28% a pH neutralizing, agent, about 0.05% biocide, about 10.4% to about 11% hydroxyl-functional PUD as described herein, and about 0.1% to about 0.75% surfactant(s) (all % by weight of the letdown clear).

As another example, a letdown clear may be prepared by mixing about 15% to about 35% water with about 0.17% to about 0.19% biocide, about 0.13% pH neutralizing agent, about 1% to about 3% surfactant(s), about 1.5% to about 1.6% defoamer(s), about 7.5% to about 7.9% solvent(s), and about 45% to about 70% hydroxyl-functional PUD as described herein (all % by weight of the letdown clear). A toner may then be prepared by mixing about 10% to about 40% mica pigment, about 0.5% to about 6% clay (either solid or in solution), about 1% to about 7% dispersing aid and about 0.1% pH neutralization agent, and about 0.5% rheology modifier, with about 25% to about 75% letdown clear (all % by weight of the toner). In order to form a basecoat, this mica toner may be mixed with a mixing clear composition comprising about 20% to about 45% acrylic latex, about 1.5% to about 1.6% clay solution, about 0.5% to about 7% cellulose ester solution (e.g. CMCAB solution), about 25% to about 50% water, about 0.7% defoamer(s), about 0.3% pH neutralization agent, about 0.2% to about 0.3% biocide, about 3% to about 10% hydroxyl-functional PUD as described herein, about 1% to about 7% water-reducible polyester resin, about 1% to about 4.5% solvent(s), and about 1.5% to about 1.6% surfactants).

As another example, a toner may comprise about 20.21% to about 40.68% water, about 0.02% to about 0.76% of a pH neutralizing agent, about 0.14% to about 8.19% of a co-grind resin, about 30.29% to about 60.58% of a hydroxyl-functional PUD as described herein, about 0.53% to about 35.47% of a chromatic pigment (all % by total weight of the toner). Optionally, the toner may comprise one or more of the following, about 0.01% to about 6.03% dispersant(s), about 0.01% to about 0.13% of defoamer, about 0.01% to about 8.69% of rheology modifierts), about 0.11% to about 1.42% of defoamer(s), about 0.73% to about 12.34% of solvent(s), and about 0.17% to about 6.65% of surfactant(s) (all % by total weight of the toner). A toner may also include 0.37% to about 1.26% silica and about 0.05% to about 0.28% bliocide (s).

Another exemplar toner composition may comprise about 1% to about 7% of a water-reducible polyester, about 3% to about 5% solvent(s), about 2% to about 7% pigment, about 0.1 to about 0.3% passivating agent, about 0.1% to about 0.6% dispersant, about 0.35% to about 0.4% pH neutralizing agent, about 10% to about 50% acrylic latex, about 5% to about 15% hydroxyl-functional PUD, about 0.11% to about 0.12% defoamer(s), about 1% to about 12% cellulose ester (e.g. CMCAB), about 25% to about 55% water, about 0.25% to about 0.27% surfactant(s), about 0.04% biocide, and about 1.7% rheology modifier (e.g. clay).

In one embodiment of the invention, a basecoat is prepared by mixing (a) one or more toners (b) water and optionally (c) a mixing clear component. In another embodiment, basecoats formulated according to the present invention have a VOC at or under 3.5 lb/gallon without the inclusion of any exempt solvents. In another embodiment, basecoats formulated according to the present invention have shelf-stability of at least 12 months and have desirable freeze-thaw stability at temperatures as low as −20° F. and are also stable at temperatres as high as 120° F. for a period of several months.

In one useful embodiment, a basecoat composition in accordance with the present invention is provided to a vehicle refinisher or an automotive original equipment manufacturer. For use, the user may mix toners to achieve the desired color characteristics. The user may then dilute the toner or toner mix with up to about 35% by weight water for use as a basecoat. If necessary, a user may also mix a toner or intermix of toners with a mixing clear composition andcor crosslinker.

Aqueous coating compositions as described herein may be used for a variety of substrates such as metal, wood, plastic, or composite materials. In one useful embodiment, the coating compositions are used as automotive basecoats which may be applied directly to an electro deposition primer or other primer or primer-surfacer.

In one useful embodiment, basecoats in accordance with the present invention dry at ambient temperatures without forced drying or UV or IR radiation and dry to sand in less than about 60 minutes, for example, less than about 45 minutes, further for example, less than about 30 minutes, even further for example, less than about 20 minutes, and further for example less than about 15 minutes. In some embodiments basec oats made in accordance with the present invention may be dry to sand in about 10 minutes or less. Basecoats in accordance with the present invention may also be dry to touch within about 2 to about 10 minutes. for example aibout 5 minutes or less. In another embodiment, basecoats of the present invention have g ood blending properties for use in repairing existing finishes.

The basecoat described herein is useful in multi-layer coating systems. Multi-layer coating systems generally include a primer, a pigmented basecoat, and a clear topcoat (clearcoat). Basecoats in accordance with the present invention can be used with almost any previous automotive finish, including many commercially available primers, adhesion promoters, etc. Desirable characteristics for primers to be used in the multi-layer coating system in accordance with the present invention include VOC compliance and relatively short dry to sand time (depending on customer needs). It should be noted that for wet-on-wet applications of basecoats over primers, it may be undesirable to have components in the basecoat that are reactive with components of the uncured primer composition. In one embodiment, a basecoat formulated according to the present invention may be applied over an acrylic urethane primer-surfacer. In another embodiment, a basecoat formulated herein may be applied over a ketimine-acetoacetate crosslinked primer surfacer.

After the primer is applied, the basecoat may be applied wet-on-wet over the uncured primer. However, in many cases, the primer is allowed to cure until it is able to be sanded prior to being coated with basecoat or a sealer. (A sealer generally has a composition similar to the basecoat to be used, but includes a lower pigment concentration and may be applied over the sanded primer to achieve a substantially smooth surface prior to application of the basecoat.) The basecoat may then be applied to the sand-scratched and optionally scaled surface.

A clearcoat may be applied to a sanded basecoat surface or wet-on-wet over an uncured basecoat. Commercially available clearcoats may be used in a multi-layer coating system as provided herein. In one embodiment, a clearcoat used in accordance with the present invention should be VOC compliant, for example having a VOC at or under 3.5 lb/gallon, excluding any exempt solvents. In another useful embodiment, it is desirable to avoid solvent strike-in bv eliminating or minimizing the presence of solvents in the clearcoat that could dissolve the basecoat. In a further useful embodiment, the clearcoat has a low degree of water permeability to protect the integrity of the clearcoat and basecoat.

Basecoats made according to the present invention inay be used in connection with a water-reducible or water-dispersable hardener containing an additional crosslinker component such as an isocvanate. The use of an external crosslinker may enhance the performance of the ecating in some situations, but its use is optional as basecoats incorporating the hydroxyl-functional PUD according to the present invention have been observed to dry by evaporation of water to yield a tough, flexible film having good abrasion resistance, ultraviolet light stability, and water and chemical resistance.

The toners discussed herein may be applicable in other segments of the coating industry as well. For example, toners as described herein could be used in automotive original equipment products such as interior or exterior coatings for plastics, industrial coatings for wood and fiberglass for mill works, as well as chemical coatings for appliances.

Coatings made in accordance with the present invention may be applied by spraying, rolling, or dipping, as well as other application means known in the art.

These and other aspects of the invention are further illustrated by the following non-limiting examples:

EXAMPLE 1

An isocyanate functional pre-polymer solution may be prepared as follows:

| Component | % Weight of Reactants |
|---|---|
| Aliphatic polyester polyol | 58.57 |
| Isophorone Diisocyanate (IPDI) | 35.86 |
| Trimethylpropanol (TMP) | 0.56 |
| Dimethylolpropionic acid (DMPA) | 4.91 |
| Dibutyltin Dilaurate Catalyst (DBTDL) | 0.10 |

The aliphatic polyester, TMP, DMPA, IPDI, and DBTDL are charged to a kettle. The mixture is heated to about 80° C. and held for about 4.5 hours. After 4.5 hours, the isocyanate content is measured by titration. Acetone (232.14 g) is added to dissolve the completed pre-polymer.

EXAMPLE 2

An isocyanate functional pre-polymer solution may be prepared as follows:

| Component | % Weight of Reactants |
|---|---|
| Aliphatic polyester polyol | 55.90 |
| Isophorone Diisocyanate (IPDI) | 38.79 |
| Trimethylpropanol (TMP) | 0.53 |
| Dimethylolpropionic acid (DMPA) | 4.68 |
| Dibutyltin Dilaurate Catalyst (DBTDL) | 0.10 |

The atiphatic polyester, TMP, DMPA, IPDI, and DBTDL are charge)d to a kettle. The mixture is heated to about 80° C. and held for about 4.5 hlours. After 4.5 lours, the isocyanate content is measured by titration. Acetone (243.24 g) is added to dissolve the completed pre-polymer.

EXAMPLE 3

A hydroxyl-functional polyurethane dispersion may be prepared as follows:

| Component | % Weight Total Dispersion |
|---|---|
| Prepolmer Solution of Example 1 | 40.98 |
| Triethylamine (TEA) | 1.45 |
| Water | 51.48 |
| 1,3-Diamino-2-propanol | 0.80 |
| Ethylene Diamine (EDA) | 0.42 |
| Water | 4.87 |

The TEA is added to the pre-polymer solution. Next, the neutralized polymer is added to water with high shear mixing. Mixing may be continued for about 5 minutes to obtain a stable dispersion. The chain extender solution (alkanolamine, EDA and water) is added with sti rng. After the reaction of the pre-polymer with the chain extender is substantially complete, the acetone is removed by distillation.

EXAMPLE 4

A hydroxyl-functional polyurethane dispersion may be prepared as follows:

| Component | % Weight Total Dispersion |
|---|---|
| Prepolmer Solution of Example 2 | 40.58 |
| Triethylamine (TEA) | 1.15 |
| Water | 50.60 |
| Aminoethylethanolamine | 0.97 |
| Ethylene Diamine (EDA) | 0.56 |
| Water | 6.14 |

The TEA is added to the pre-polymer solution. Next, the neutralized polymer is added to the water with high shear mixing. Mixing may be continued for about 5 minutes to obtain a stable dispersion. The chain extender solution (alkanotamine, EDA and water) is added with stirring. After the reaction of the pre-polymer with the chain extender is substantially complete, the acetone is removed by distillation.

EXAMPLE 5

A toner formulation of the present invention may be made by combining the following coimponents:

| Component | % Weight of Toner |
|---|---|
| Water | 26.45 |
| Amine | 0.17 |
| Co-grind resin[1] | 0.84 |
| Silicone defoamer | 0.02 |
| Polymeric dispersant | 0.6 |
| Carbon black pigment | 1.26 |
| Synthetic amorphous silica | 1.15 |
| Associative thickener | 0.46 |
| Hydroxyl-Functional PUD | 53.88 |
| Propylene glycol n-propyl ether | 2.24 |
| Diethylene glycol methyl ether | 4.5 |
| Propylene glycol methyl ether | 4.5 |
| Acetylenic diol-based surfactant | 1.2 |
| Nonionic surfactant | 0.52 |
| Biocide | 0.16 |
| Associative thickener | 1.69 |

[1]Prepared according to U.S. Pat. No. 6,057,400, Col. 7, 11.28-46.

EXAMPLE 6

A toner composition in accordance with the present invention may be made by combining the following components:

| Component | % Weight of Toner |
|---|---|
| Ethylene glycol butyl ether | 2.03 |
| N-methyl-2-pyrrolidone | 2.68 |
| Mineral spirits | 0.25 |
| Aluminum pigment | 4.57 |
| Phosphoric acid ester | 0.18 |
| Polymeric dispersant | 0.46 |
| Amine | 0.35 |
| Acrylic latex | 27.49 |
| Water-reducible polyester resin | 3.84 |
| CMCAB solution[1] | 7.43 |
| Hydroxyl-Functional PUD | 7.78 |
| Non-Silicone synthetic defoamer | 0.11 |
| Water | 42.83 |
| Acetylenic diol-based surfactant | 0.16 |
| Nonionic surfactant | 0.09 |
| Biocide | 0.04 |
| Associative thickener | 1.7 |

[1]CMCAB solution contains CMCAB, water, and ethylene glycol butyl ether.

While the present invention has been illustrated by the description of embodiments thereof and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details and illustrative examples shown and described. Accordingly, departures may be made from such details without departing from the spirit or scope of the applicant's general inventive concept.

What is claimed is:

1. A multi-layer automotive coating system comprising:
 (1) a primer;
 (2) a basecoat comprising a polyurethane dispersion, wherein the polyurethane dispersion comprises
  (a) a hydroxyl-functional polyurethane resin comprising the reaction product of (i) an isocyanate pre-polymer intermediate, which comprises the reaction product of an isocyanate and a compound comprising at least one active hydrogen and
(ii) a chain extender compound comprising at least two amine groups and one hydroxyl group;
wherein the hydroxyl-functional polyurethane resin is substantially free of terminal hydroxyl groups; and
(b) water;
wherein the basecoat dries at ambient temperature to form a film on a surface; and
(3) a clearcoat.

2. The multi-layer automotive coating system of claim 1, wherein the compound comprising at least one active hydrogen is a polyhydroxy compound.

3. The multi-layer automotive coating system of claim 1 wherein the polyhydroxy compound is selected from polyhydroxylated polyethers, polyhydroxylated polyesters, polyhydroxylated polyesteramides, polyhydroxylated polycarbonates, polyhydroxylated hydrocarbons and polyhydroxylated acrylics.

4. The multi-layer automotive coating system of claim 1 wherein the chain extender compound is selected from 1,3-diamino-2-propanol and aminoethylethanolamine.

5. The multi-layer automotive coating system of claim 1, wherein the hydroxyl-functional polyurethane resin has a hydroxyl value of about 0.62 to about 62.3.

6. The multi-layer automotive coating system of claim 1 wherein the hydroxyl-functional polyurethane resin has a hydroxyl value of about 10 to about 20.

7. The multi-layer automotive coating system of claim 1 wherein the hydroxyl-functional polyurethane resin has an Mn of about 20,000 as measured by gel permeation chromoatography based on a polystyrene standard.

8. The multi-layer automotive coating system of claim 1 wherein the hydroxyl-functional polyurethane dispersion has a viscosity that is less than about 5000 cPs.

9. The multi-layer automotive coating system of claim 1 wherein the hydroxyl-functional polyurethane dispersion has a viscosity that is less than or equal to about 500 cP.

10. The multi-layer automotive coating system of claim 1 wherein the hydroxyl-functional polyurethane dispersion has a solids content of about 33% to about 35%.

11. The multi-layer automotive coating system of claim 1 wherein the basecoat further comprises at least one pigment.

12. The multi-layer automotive coating system of claim 1 wherein the basecoat has a volatile organic content of less than or equal to 3.5 lb/gallon.

13. The multi-layer automotive coating system of claim 1 wherein the basecoat has a dry to sand time of less than about 60 minutes.

14. The multi-layer automotive coating system of claim 1 wherein the basecoat further comprises a cellulose ester or a modified cellulose ester.

15. The multi-layer automotive coating system of claim 1 wherein the basecoat further comprise carboxymethylcellulose acetate butyrate.

16. The multi-layer automotive coating system of claim 1 wherein the basecoat further comprises an acrylic latex resin.

17. The multi-layer automotive coating system of claim 1 wherein the basecoat further comprises a water-reducible polyester resin.

18. The multi-layer automotive coating system of claim 1 wherein the basecoat further comprises a cross-linker selected from isocyanates and melamines.

19. The multi-layer automotive coating system of claim 1 wherein the basecoat further comprises a pigment dispersion comprising at least one pigment and a co-grind resin.

20. The multi-layer automotive coating system of claim 1 wherein the pigment dispersion comprises a hydroxyl-functional co-grind resin.

21. The multi-layer automotive coating system of claim 20 wherein the hydroxyl-functional co-grind resin comprises the reaction product of:
(1) about 5% to about 15% by weight methyl methacrylate,
(2) about 5% to about 15% by weight styrene,
(3) about 10% to about 20% by weight butyl acrylate,
(4) about 35% to about 45% by weight butyl methacrylate,
(5) about 10% to about 20% by weight hydroxy ethyl methacrylate, and
(6) about 5% to about 10% by weight acrylic acid.

22. The multi-layer automotive coating system of claim 19, wherein the at least one pigment is selected from titanium dioxide, carbon black, graphite black, transparent iron oxide red, transparent iron oxide yellow, opaque iron oxide red, opaque iron oxide yellow, nickel titanate yellow, bismuth vanadate yellow, quinacridone red, quinacridone magenta, quinacridone purple, phthalocyanine copper blue, phthalocyanine copper green, naphthlenolato copper yellow, isoindolinone yellow, benzimidazolone yellow, benzimidazolone orange, diketo pyrrolo pyrolle orange, diketo pyrrolo pyrolle red, anthraquinone red, oxazine violet, and indanthrone blue.

23. The multi-layer automotive coating system of claim 19, wherein the basecoat comprises about 0.5% to about 35.5% by weight pigment.

24. The multi-layer automotive coating system of claim 19, wherein the basecoat comprises about 7% to about 60% by weight of the hydroxyl-functional polyurethane dispersion.

25. The multi-layer automotive coating system of claim 1, wherein the primer is selected from an acrylic urethane primer-surfacer and an ketimine-aceto-acetate crosslinkied primer surfacer.

26. A substrate coated with a multi-layer coating system, wherein the multi-layer coating system comprises:
(1) a primer;
(2) a basecoat comprising a polyurethane dispersion, wherein the polyurethane dispersion comprises the reaction product of
(a) a hydroxyl-functional polyurethane resin comprising the reaction product of
(i) an isocyanate pre-polymer intermediate, which comprises the reaction product of an isocyanate and a compound comprising at least one active hydrogen and
(ii) a chain extender compound comprising at least two amine groups and one hydroxyl group;
wherein the hydroxyl-functional polyurethane resin is substantially free of terminal hydroxyl groups; and
(b) water;
wherein the basecoat dries at ambient temperature to form a film on the substrate; and
(3) a clearcoat.

* * * * *

UNITED STATES PATENT AND TRADEMARK OFFICE
CERTIFICATE OF CORRECTION

PATENT NO. : 7,875,355 B2
APPLICATION NO. : 11/427979
DATED : January 25, 2011
INVENTOR(S) : Sean X. Huang et al.

It is certified that error appears in the above-identified patent and that said Letters Patent is hereby corrected as shown below:

In the Specification

Column 1, line 24, delete "stringent?", insert --stringent,--.

Column 2, lines 48 and 54, Column 5, line 44, delete "extenders.", insert --extender.--.

Column 2, line 64, delete "nay", insert --may--.

Column 4, line 26 through 27, delete "dipentaaerythritol", insert --dipentaerythritol--.

Column 5, line 54, delete "L", insert --e.g.--.

Column 5, line 55, delete "nethyldiethanolamine", insert --methyldiethanolamine--.

Column 6, line 12, delete "for", insert --form--.

Column 6, line 33, delete "alechols" and "hydrocarbons-", insert --alcohols-- and --hydrocarbons,--.

Column 6, line 34, delete "ma,", insert --may--.

Column 7, line 12, delete "3", insert --20--.

Column 10, line 31, delete "Cogrind", insert --Co-grind--.

Column 10, line 42, delete "pigmi-ent", insert --pigment--.

Column 10, Line 46, delete "althouglh", insert --although--.

Column 11, Line 32, delete "eiulsion polytmers", insert --emulsion polymers--.

Signed and Sealed this
Fourteenth Day of July, 2015

Michelle K. Lee
*Director of the United States Patent and Trademark Office*

CERTIFICATE OF CORRECTION (continued)

Column 11, Line 33, delete "mnixing", insert --mixing--.

Column 11, Line 62, delete "78.5%", insert --28.5%--.

Column 12, Line 12, delete "97.1%", insert --27.1%--.

Column 12, Line 14, delete "piginent", insert --pigment--.

Column 12, Line 17, delete "defoamner(s)", insert --defoamer(s)--.

Column 12, Line 59, delete "bliocide(s)", insert --biocide(s)--.

Column 12, Line 61, delete "exemplar", insert --exemplary--.

Column 13, Line 13 and 14, delete "temperatres", insert --temperatures--.

Column 13, Line 22, delete "andcor", insert --and/or--.

Column 13, Line 36, delete "basec_oats", insert --basecoats--.

Column 13, Line 39, delete "aibout", insert --about--.

Column 13, Line 41, delete "g_ood", insert --good--.

Column 14, Line 3, delete "scaled", insert --sealed--.

Column 14, Line 18, delete "inay", insert --may--.

Column 14, Line 22, delete "ecating", insert --coating--.

Column 15, Line 12, delete "charg)d", insert --charged--.

Column 15, Line 13, delete "hlours", insert --hours--.

Column 15, Line 13, delete "lours", insert --hours--.

Column 15, Line 25 and 49, delete "prepolmer", insert --prepolymer--.

Column 15, Line 37, delete "st ring", insert --stirring--.

Column 15, Line 49, delete "prepolmer", insert --prepolymer--.

Column 15, Line 59 through 60, delete "alkanotamine", insert --alkonolamine--.

Column 15, Line 67, delete "coimponents", insert --components--.

CERTIFICATE OF CORRECTION (continued)
U.S. Pat. No. 7,875,355 B2

In the Claims

Column 18, Line 39, delete "crosslinkied", insert --crosslinked--.